Figure 1:
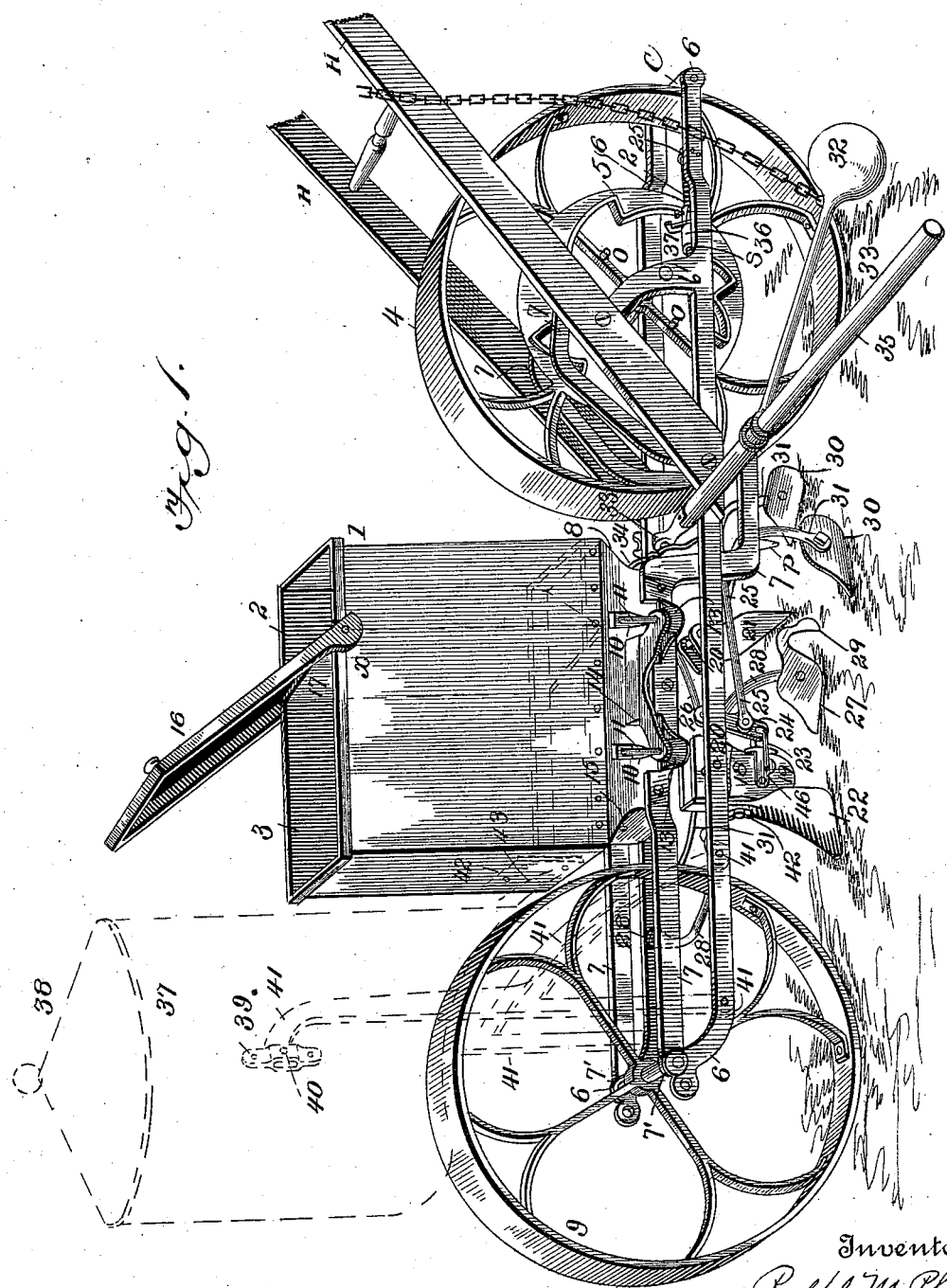

(No Model.) 4 Sheets—Sheet 1.
R. M. PHILLIPS.
SEED PLANTER.

No. 574,937. Patented Jan. 12, 1897.

Witnesses
H. E. Thomas
R. G. Owens.

Inventor
Ralph M. Phillips
Per
Harris & Baldwin
Attorneys (No Model.) 4 Sheets—Sheet 2.

R. M. PHILLIPS.
SEED PLANTER.

No. 574,937. Patented Jan. 12, 1897.

Fig. 2.

Witnesses
H. E. Thomas
R. G. Owens

Inventor
Ralph M. Phillips
Per
Harris & Baldwin
Attorneys

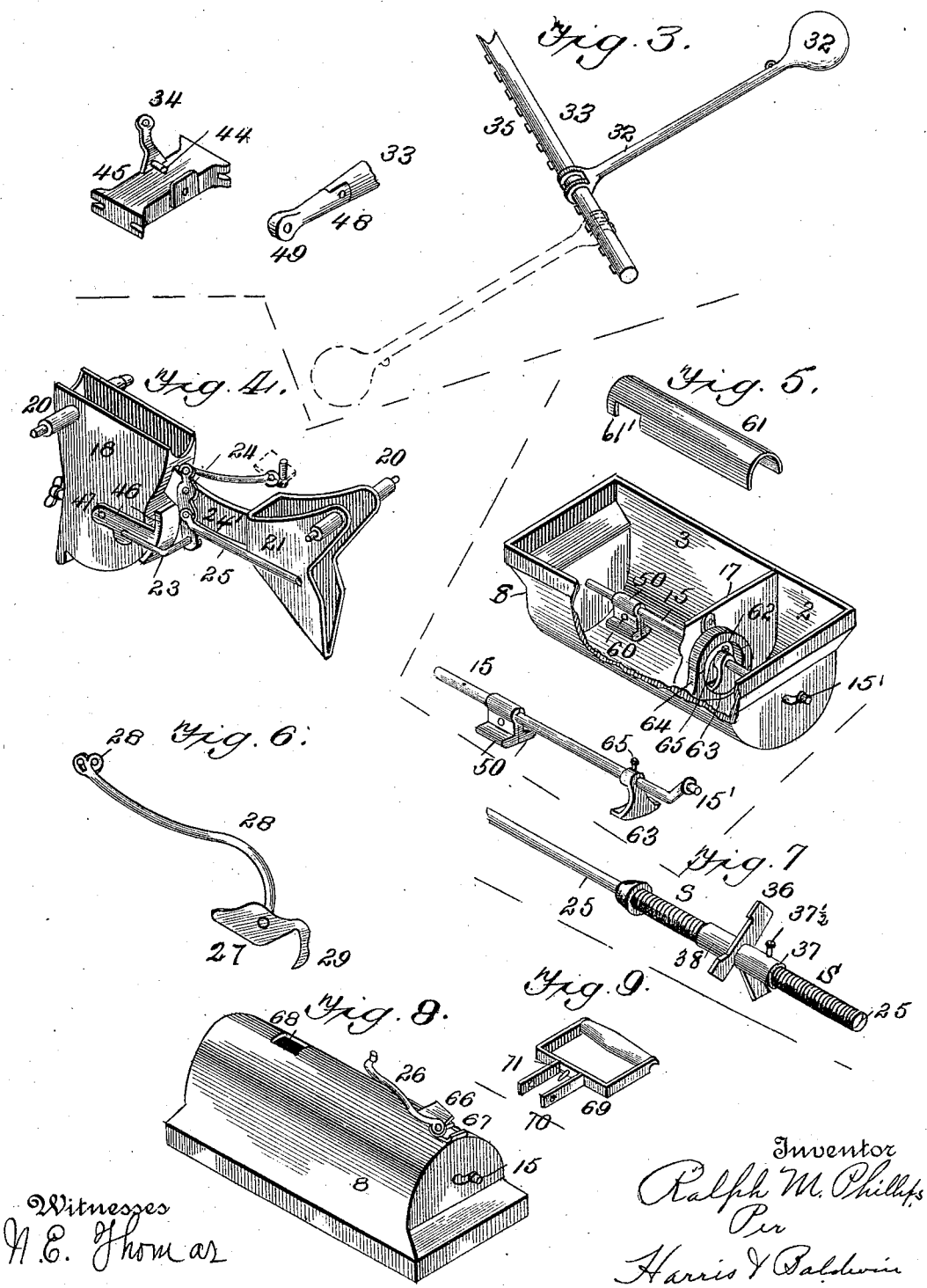

(No Model.) 4 Sheets—Sheet 4.
R. M. PHILLIPS.
SEED PLANTER.
No. 574,937. Patented Jan. 12, 1897.
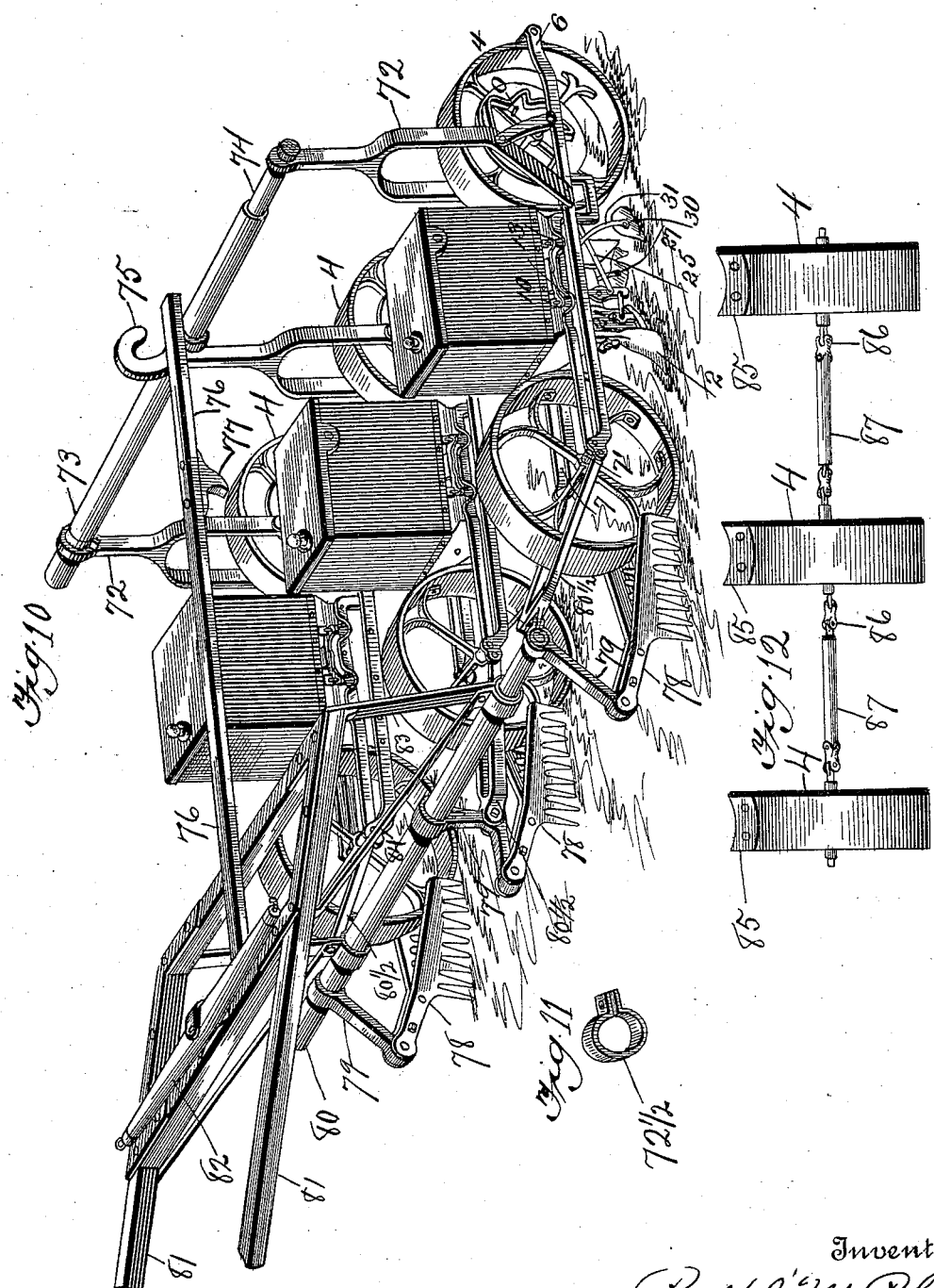
Witnesses
N. E. Thomas
R. G. Owens.
Inventor
Ralph M. Phillips
Per
Harris & Baldwin
Attorneys

UNITED STATES PATENT OFFICE.

RALPH M. PHILLIPS, OF JAMESTOWN, NEW YORK.

SEED-PLANTER.

SPECIFICATION forming part of Letters Patent No. 574,937, dated January 12, 1897.

Application filed January 10, 1896. Serial No. 574,957. (No model.)

*To all whom it may concern:*

Be it known that I, RALPH M. PHILLIPS, a citizen of the United States, residing at Jamestown, in the county of Chautauqua and State of New York, have invented certain new and useful Improvements in Seed-Planters; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

The object of my invention is to make a seed-planter adapted to plant the great variety of seeds from corn or beans down to the smallest garden-seed in drills or hills, as desired, and so arranged that phosphate or other fertilizer may be dropped and covered before the seed is put in; also, to combine and connect two or more of these planters in such a manner that they may be successfully used by attaching a horse to them, planting two or more rows at a time.

The improvements will be fully understood by this specification and the accompanying drawings, in which—

Figure 1 is a partial perspective view of a planter having my improvements. Fig. 2 shows a side elevation of the planter, having seedbox-frame elevated; Fig. 3, a detail of the marker attachment. Fig. 4 is a perspective view of fertilizer and seed-spouts and connections. Fig. 5 shows perspective view of bottom of seed and phosphate box, partially broken away, with hood, vibrating rod, and attachments. Fig. 6 shows view of fertilizer-coverer and connecting-rod. Fig. 7 shows view of tripping device. Fig. 8 shows bottom of seed and fertilizer box. Fig. 9 shows metal handle. Fig. 10 shows three planters connected. Fig. 11 shows adjusting-clamp. Fig. 12 shows three drive-wheels connected having hill-stamping device.

The parts will be more fully explained as I proceed with this specification.

In Fig. 1 of the drawings, 1 is a metal seed and fertilizer box, 2 being the apartment for seed and 3 for fertilizer, the apartments being separated by metal partition 17.

16 is the cover for both apartments, hinged at the partition. The cover for the seed-apartment falls into this part when the other end is raised.

The upper part of the hopper is preferably of sheet metal and has a malleable oval base 8, (shown in Figs. 5 and 8,) to which it is securely attached, the base being securely bolted to the vibrating frame 7 7.

9 is a broad metal carrying-wheel journaled at the front end of my planter.

4 is the driving-wheel that is journaled in the metal side frames, in which it is mounted as shown in Figs. 1, 2, and 10.

The drive-wheel is provided with an interior ratchet 5, on which travel small friction-rollers R, which are journaled in the rear end of the box-frames 7 7, Fig. 2, the object being to give a short and sharp concussion to the box as the friction-rollers fall off the highest part of the incline of the ratchet, thus keeping the seed and fertilizer well shaken up, and also to vibrate rod 15 in the seed and fertilizer box, the wrist of crank 15' having its bearing in hole 34, Fig. 3. This rear wheel is provided with trip-pins O O O O, as shown in Fig. 2, which may be cast onto the malleable spokes of the wheel or made separate and secured thereto and are for the purpose of engaging trip 36, as shown in Fig. 7, so that when it is desired to plant in hills they may be put in at different distances. 37 and 38 are sleeves. 37½ is the set-screw for holding the sleeve 37 secure to the rod 25, the spring S holding it against the sleeve 38 on the other side, as shown. When it is desired to plant in drills, this trip 36 is moved out of contact with the trip-pins O O O O, the bottom 46 drawn back, and there is a steady flow of seed or fertilizer the size of the openings of the seed and fertilizer box.

The metal sides of frame 6 6 have arms 6' 6' 6' toward their rear end that extend upward to form boxes for the journal of the rear wheel to turn in and also to secure the handles of the planter, as shown in Fig. 1. These sides have a cross-piece 34 securely bolted between them in front of the rear wheel for the purpose of keeping the sides of the frame the proper distance apart. This cross-piece has also at its center an arm extending upward having a pin 44, to which the end of the marker-arm casting is secured and on which it turns. The main part of this marker-arm 33 I make of hard wood turned round and at short intervals drive in double-pointed tacks, as shown in Fig. 2.

32 is the marker-blade, made, preferably, of malleable iron. This blade is thick in the center and tapers down quite sharp at its outer edge, so as to cut a furrow deep enough to be visible in any common soil. The blade has a malleable arm to connect it to the arm 33, the arm being cast with an opening to go onto the main arm and provided with a slot to receive the double tack, so that by turning the blade to the opposite side of the rod or arm 33 it is shoved along any desired distance, and when turned back to place the tacks can come into the connecting-joint and securely hold it in position.

The marker has a small chain or cord attached to it by which the operator can swing it over to the opposite side when the planter is turned around, or it may be secured in an upright position, when desired, by the chain which is attached to the marker 32 being hooked upon the handles.

Within the frame 6 6 I hang the fertilizer-boot 18 and the seed-boot 21, which are connected by a bridge 24', as seen in Fig. 2. These boots have journals 20 20 20, that enter the sides of the frame, which, when properly secured together, hold these boots in a rigid upright position.

It will be readily understood that the seedbox-frame as shown in Fig. 2 is placed there simply to enable one to obtain a more distinct view of the different parts. It is shown in proper place in Fig. 1, except that the top of the boots come in contact with the oval bottom of seed and fertilizer box to make a close joint and also to receive the fertilizer and seed through them. Boot 18 has an oval hinged bottom 46, (shown closed in Fig. 2 and open in Fig. 4,) which is operated by arm 23. 24 is a metal arm hinged to the aforesaid bridge near boot 18 and has connected to it the operating-rod 25, which has trip-arm 36 at the rear end made of three different lengths, which can be turned to strike trip-pins O O O O as desired. This metal arm 24 has short arm 26 to connect with the seedbox 66, as shown in Fig. 8. The trip-arm 36 being made in three different lengths and coming in contact with the trip-pins O O O O causes the arm to operate at the proper time to give the desired distance apart. The boot 21 is formed to come nearly to a point at its lower end to keep the seed from scattering too much as it reaches the ground.

Cross-piece 34 has a hole at the top of its upright arm to receive the wrist 15' of the rod 15. The rise and fall of the end of box-frame 7 7 causes the seed and fertilizer box to go up and down, the points $p$ dropping below the main-frame side bars 6 6 to prevent the frame from moving sidewise, and the crank or wrist 15' turns rod 15, which has secured to it over the openings in the bottom of the box in the fertilizer and seed apartments the arms or blocks 50 and 63, as shown in Fig. 5. The rising and falling of the box causes blocks 50 and 63 to open and close the seed and fertilizer pockets as they oscillate with movement of the crank 15'. Blocks 50 and 63 stir the seed and fertilizer and act as an automatic cut-off when not sowing.

61 is a long oval hood that goes over rod 15 in the fertilizer-box to hold the superincumbent mass of fertilizer from coming too much in contact with said rod, the opening 61' being the door through which a sufficient quantity passes.

64 is a hood over the seed-pocket to prevent pressure of seed on arm 63.

The inside of the bottom of the seedbox is inclined toward the pocket in order to insure the delivery of all the seed in the box.

It is desirable to cover the fertilizer before the seed is dropped upon it, to prevent the fertilizer from burning the seed, and to accomplish this I make the plow or coverer 27, which has a rear extension 29, as shown. This extension is so formed that when the main part of the coverer has turned the soil over the fertilizer its rear part 29 is turned to the left and strikes the center of the ridge so thrown up and opens a new channel or furrow for the seed to fall in. The reason that this part is made small is that only a small opening for the seed is desired. This one piece is a coverer and furrow-opener at the same time and may be set at the front of its connecting-rod to run shallow or deep, as desired.

22 is a steel or metal shovel that is secured to the fertilizer-boot by bolt and thumb-nut 42, as indicated in Fig. 2. This shovel has means for adjustment to any desired height and is a furrow-opener for the fertilizer, which drops just behind it.

30 30 are covering-plows, and may be so set as to throw as much or as little soil as wanted, and are connected to the main frame by long curved rods 31 31, which work independent of each other.

10 10 are long flat metal slides, bent at their lower ends to conform to the lower part of box 8, and are used to increase and decrease the size of the seed and fertilizer openings, and have holes at their top end to receive the threaded wires 11 11, and by turning the threaded nuts 13 13 the slides are drawn up and down, as desired.

I use wood for the main part of my handles H H, Fig. 1, which are the handles referred to, connecting them to the frame sides at their lower end and putting on the malleable top 69, Fig. 9, for a handhold, the pin 71 entering the center of the wood with a bolt through the side pieces, the hand part being cast oval, so as not to hurt the hand.

Fig. 10 shows three planters connected side by side.

72 72 are metal forks, securely bolted to the main frame nearly over the center of the wheels 4 4 4, which coming together form uprights to receive metal tubes 73 and 74, one being made to slide into the other, so as to allow of all needed adjustment. A connecting-lever 76 is arranged to rest its rear end on tube 73 and extends forward to connect with the front part of the frame, and has a catch 77, secured to its under side, in order that the rear end of the planters may be raised high enough to allow the rod 73 to be embraced by catch 77, and thus suspend the rear end of the machines while going to the field.

The hook 75 at the top of the center fork is not rigidly secured to the tube 73, but is left in hook form to allow the center planter to adjust itself to the unevenness of the ground.

78 78 78 are malleable or steel rakes placed in front of each planter, as shown, to rake off stone or rubbish from the track of the machines, but where soil is clean and well pulverized these will not be needed. Long forks 80½ are attached to the front end of frame 6 6 and have their other end connected to draw-bar 80 in a suitable manner, the same being provided with thills 81 81 for attaching a horse to draw this gang of planters.

I secure the rear wheels together by universal couplings and tubes, as shown in Fig. 12, so that while they are independent to adjust themselves to the ground yet they move together as they move ahead. Thus the seed-trips of all the hoppers, when planting in hills, will operate at the same time, and that I may know that they do this and that I start each row so that I am certain they will check-row, I attach the concave metal piece 85 to each of the drive-wheels 4 4 4, as shown in Fig. 12.

Sometimes it is desirable to carry more fertilizer than box 3 will hold, in which case I place a metal box 37 over the front wheel, as shown by dotted lines in Fig. 1, and secure it by having ears 39 on each side, into which standards 41 coming up from the main frame are secured by bolt or rivet 40. A spout from the bottom of this can or box enters the front side of box 3, as indicated by dotted lines 42, and all its contents are readily discharged into it as fast as desired.

Having fully described my invention, what I claim as new, and desire to secure by Letters Patent, is—

1. In seed-planters, the side-frames 6, 6, constructed to receive the journals of a broad carrying-wheel at their front end, a drive-wheel within their rear ends, the sides having arms above the line of said sides and in which said drive-wheel is journaled, the sides being secured together by bolts and cross-piece 45 provided with arm 34 to receive the wrist 15' of rod 15, and pin 44 to which the marker is hinged, substantially as shown.

2. In seed-planters, the metal side pieces 7, 7, hinged at their front end, having fertilizer and seed box secured thereto, the sides being bent at the rear of said box to drop below and within the main sides 6, 6, of the planter-frame, the rear ends being turned up and having wrists on which revolving antifriction-rollers travel in the ratchet-wheel, substantially as shown.

3. In seed-planters, the metal side pieces 7, 7, hinged at their front end, and provided with antifriction-rollers at their rear ends to travel in the ratchet-wheel, in combination with a fertilizer and seed box secured thereto, substantially as shown.

4. In seed-planters, the upper box 1, having apartments 2 and 3, secured to the oval base 8, said base having a rod passing through its center, which rod is provided with opening and closing blocks 50 and 63, the rod being turned at one end to form a crank for moving the blocks back and forth, substantially as described.

5. In seed-planters, the seed and fertilizer box constructed as shown, a rod passing through the center of the base-carrying blocks 50 and 63, in combination with protecting-hoods 61, and 64, as described.

6. In seed-planters, the boot 18, hung within the main frame 6, 6, and provided at its lower end with a curved hinged door, and suitable connecting-rods to open and close the door, substantially as described.

7. In seed-planters, the boot 18 constructed and pivoted in the sides 6, 6, as shown, having the metal bridge 24' to secure it to seed-boot 21, which is also pivoted in the main frame, the lower part of boot 21 being drawn together to prevent the seed from scattering, substantially as described.

8. In seed-planters, the double plow 27, 29, having its large front part 27 to cover the fertilizer and its rear end 29 curved and small to open a furrow for the seed, substantially as described.

9. In seed-planters, the adjustable opening-plow 22, secured to the front of the fertilizer-boot, the rear double plow 27, 29, and covering-plows 30, 30, made as shown, and arranged to operate in the positions and for the purpose described.

10. In seed-planters, the adjustable trip 36, having arms of different lengths and mounted on rod 25, between springs s, s, in combination with trip-pins O, O, O, O, on the drive-wheel for the purpose of operating the feed and fertilizer rods, substantially as described.

11. In seed-planters, the adjusting-pipes 73, 74, made as shown, the arms of upright forks that are secured to the rear of two or more planter-frames, substantially as described.

12. In seed-planters, the adjusting-pipes 73, 74, connecting the arms of upright forks that connect two or more planters, in combination with a center fork attached to the rear of a center planter-frame, the fork-arm of the planter having a hook to engage the connecting-pipes, substantially as described.

13. In seed-planters, the cross-piece 76, secured at its front end to the central frame of a gang of planter-frames, and provided on its under side with a hook 77 to engage the connecting-pipe 73, to hold the rear end of the planter-frames in a raised position while turning corners or going afield, substantially as shown and for the purpose set forth.

14. In seed-planters, rear forks secured to the planter-frame, having stems to connect with adjusting-pipes, a cross-bar provided with a hook to engage the pipes, the front end of cross-bar being secured to the central frame of the planters, in combination with thills and front drawing connections, substantially as described.

15. In seed-planters, the malleable or steel rakes 78, 78, 78, provided with hinged arms to connect with the draw-bar of the planter, substantially as described.

In testimony whereof I affix my signature in presence of two witnesses.

RALPH M. PHILLIPS.

Witnesses:
N. E. THOMAS,
R. G. OWENS.